A. B. GREEN.
APPARATUS FOR MEASURING THE VISCOSITY OF PAPER STOCK.
APPLICATION FILED APR. 21, 1917. RENEWED SEPT. 12, 1919.

1,321,736.  Patented Nov. 11, 1919.

Inventor:
Arthur B. Green
by S. W. Bates
Atty.

UNITED STATES PATENT OFFICE.

ARTHUR B. GREEN, OF PORTLAND, MAINE.

APPARATUS FOR MEASURING THE VISCOSITY OF PAPER-STOCK.

1,321,736.　　　　Specification of Letters Patent.　　Patented Nov. 11, 1919.

Application filed April 21, 1917, Serial No. 163,735. Renewed September 12, 1919. Serial No. 323,435.

*To all whom it may concern:*

Be it known that I, ARTHUR B. GREEN, a citizen of the United States, residing at Portland, in the county of Cumberland and State of Maine, have invented certain new and useful Improvements in Apparatus for Measuring the Viscosity of Paper-Stock, of which the following is a specification.

My invention relates to an apparatus designed to be used for determining the density and fluidity (or what is commonly spoken of as the viscosity) of paper stuff and it is intended to be applied to the paper stuff, when the same is in process of manufacture, in the beating or refining engine, although it may be otherwise used. It has been found that the viscosity of paper stock and certain paper making qualities of such stock, vary in the same degree and the determination of viscosity thus becomes important.

According to my Patent No. 1,125,017 issued Jan. 12, 1915, I made use of a drag or float which was immersed in the moving body of paper stock in the beater and was so arranged that its resistance to the moving body of pulp could be accurately measured, such resistance varying in proportion to the viscosity. This method of determining viscosity, depended on the uniform speed with which the beater roll revolved and this uniform speed was not always easy to get for various reasons. When the speed varied for any reason, this method was not applicable.

According to my present invention, I am not dependent on the uniform rate of rotation of the beater roll, but the viscosity may be accurately measured, whatever the rate of flow may be.

In my apparatus, I make use of a rotatable body which is preferably formed with blades or wings which has no effect in propelling the stock and is submerged in the paper stock where it is rotated at a uniform rate of speed by means of a suitable motor. The measurement of the power necessary to produce the uniform rotation and the variation of such power accurately determine the viscosity of the paper stock. The same result may be obtained by applying to the rotor a uniform amount of power and measuring the rotations of the rotor these two operations being regarded as equivalent in the specifications and claims both being in effect the measurement of power.

Figure 1:
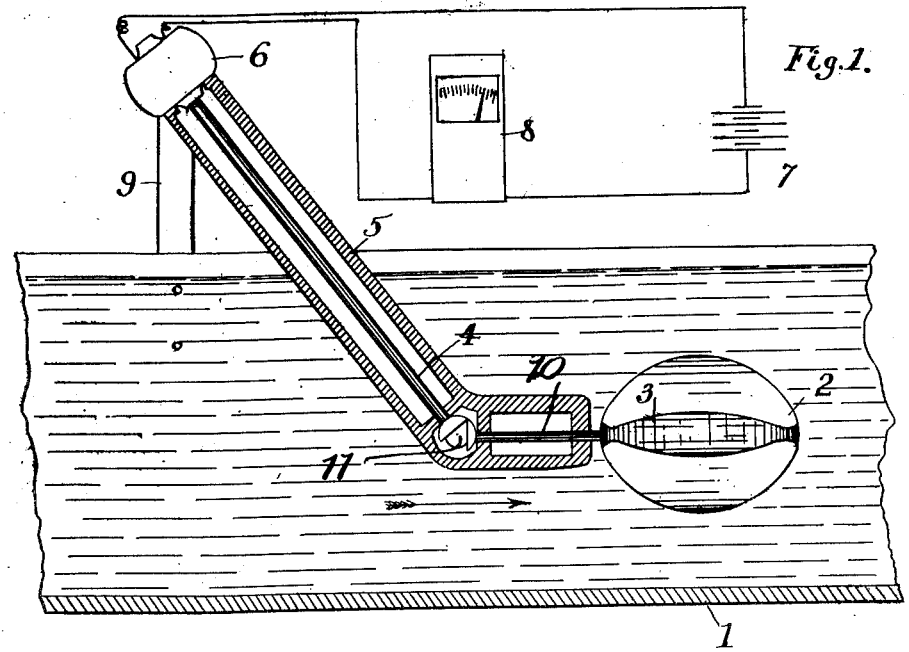
Figure 2:
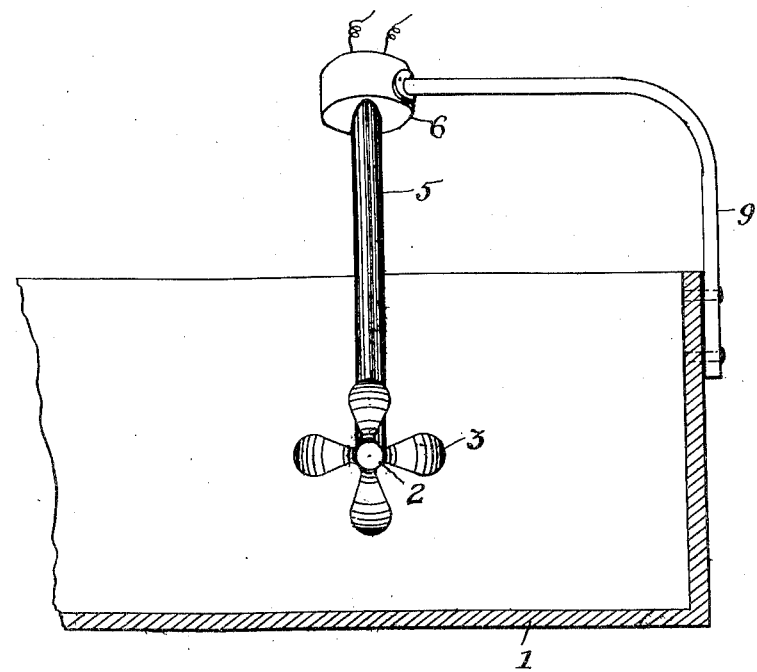

My invention may best be understood by the accompanying drawing in which,

Figure 1 is a side elevation with a portion in section showing the apparatus as applied to a beating engine in which the paper stuff is being circulated and, Fig. 2 is a cross section through the tank showing an end elevation of the apparatus.

In the drawing, 1 represents the casing of the beater and 2 is a rotatable body designed to be immersed in the moving paper stuff and preferably constructed as here shown with wings or blades 3.

This rotatable body may be made of any desirable form which will not act to propel the liquid in the direction in which it is moving. The form of the device will vary according to the use to which it is to be put, so that it may develop skin friction or internal friction or both, the measurement of this friction being relied upon to indicate the degree of viscosity.

In the form shown with thickened blades, both skin friction and internal friction would be developed to a considerable extent.

The body 2 is secured to the end of a flexible shaft which is inclosed in a water tight casing and this casing extends above the surface of the paper stuff. As here shown, the flexible shaft is composed of an inclined portion 4, a horizontal portion 10 the two portions being connected by a universal joint 11. The lower end of the casing, as here shown, is horizontal or parallel with the bottom of the tank and the body of the casing extends in an inclined direction up out of the liquid, so as to reduce the friction.

The friction is further reduced by making the casing with an oval or oblong cross-section, so as to present as little surface as possible to the direct flow of the paper stuff.

On the upper end of the casing, is located an electric motor 6 supported by a bracket connected to rotate the shaft 4 and thence the body 2. In practice it is desirable to connect the motor to the shaft by means of suitable gearing by which the speed of this motor may be greatly reduced. I have found that a speed of about 20 revolutions per minute gives good results.

A source of electric power is indicated diagrammatically at 7 and a watt-meter at 8.

An automatic recording device may be connected with the meter 8 in any well known manner, so that a continuous curve may indicate graphically the variations of power used and of the consequent viscosity of the liquid.

This apparatus may be used in paper stuff in motion and indicates with great accuracy the variation of viscosity of the liquid.

I claim:—

1. An apparatus for determining the viscosity of flowing liquids which consists of a non-propelling rotatable body adapted to be submerged in the liquid, means for rotating said body while submerged in a plane transverse to the direction of motion of the liquid and means for measuring the power required for rotating the body.

2. An apparatus for determining the viscosity of flowing liquids which consists of a non-propelling rotatable body adapted to be submerged in said liquid, means for rotating said body at a uniform rate of speed in a plane transverse to the direction of motion of the liquid while submerged and means for measuring the power required for such rotation.

3. In an apparatus for determining the viscosity of flowing liquids, the combination of a non-propelling rotatable body adapted to be submerged in the liquid, said body having blades or wings, a motor for rotating said body in a plane transverse to the direction of motion of the liquid while submerged and a meter for measuring the power required for such rotation.

4. In an apparatus for determining the viscosity of moving liquids, the combination of a non-propelling rotatable body adapted to be submerged in the liquid, said body having blades or wings, a shaft for rotating said body, a casing for said shaft, an electric motor supported above the liquid for rotating said shaft, and a meter for measuring the power necessary to produce such rotation.

5. In an apparatus for determining the viscosity of moving liquids, the combination of a rotatable body adapted to be submerged in the liquid, said body having blades, or wings, an inclined shaft for rotating said body, a casing for supporting said shaft, an electric motor for rotating said shaft supported above the liquid and a meter for measuring the power required to produce such rotation.

6. In an apparatus for determining the viscosity of moving liquids, the combination of a rotatable body adapted to be submerged in the liquid, a shaft for rotating said body, a hollow casing for said shaft having an oval cross-section the shaft being located with its longer diameter in the direction of the motion of the liquid, a motor for driving said shaft and a meter for measuring the power necessary to produce the rotation of said shaft and body.

In testimony whereof I hereby affix my signature.

ARTHUR B. GREEN.